（12）United States Patent
Gosling et al.

(10) Patent No.: US 9,328,542 B2
(45) Date of Patent: May 3, 2016

(54) CAM STYLE LOCKS AND SYSTEMS AND METHODS INCLUDING THE SAME

(75) Inventors: Geoff Gosling, Calgary (CA); Mogens F. Smed, DeWinton (CA); Thomas A. Brown, Calgary (CA)

(73) Assignee: DIRTT Environmental Solutions, LTD, Calgary, CA (US)

( * ) Notice: Subject to any disclaimer, the term of this patent is extended or adjusted under 35 U.S.C. 154(b) by 0 days.

(21) Appl. No.: 13/579,265

(22) PCT Filed: Jul. 5, 2012

(86) PCT No.: PCT/US2012/045595
§ 371 (c)(1),
(2), (4) Date: Aug. 15, 2012

(87) PCT Pub. No.: WO2013/062641
PCT Pub. Date: May 2, 2013

(65) Prior Publication Data
US 2014/0225381 A1 Aug. 14, 2014

Related U.S. Application Data

(60) Provisional application No. 61/551,055, filed on Oct. 25, 2011.

(51) Int. Cl.
*E05C 3/06* (2006.01)
*E05C 3/12* (2006.01)
(Continued)

(52) U.S. Cl.
CPC . *E05C 3/12* (2013.01); *E05B 15/00* (2013.01); *E05B 15/10* (2013.01); *F16H 25/14* (2013.01); *E05B 63/00* (2013.01); *E05B 63/0013* (2013.01); *E05C 3/00* (2013.01); *E05C 3/045* (2013.01);
(Continued)

(58) Field of Classification Search
CPC ........... E05C 3/00; E05C 3/045; E05B 63/00; E05B 63/0013
USPC ........... 292/197, 98, 111, 124, 140, 159, 169, 292/187, 215, 224, 234
See application file for complete search history.

(56) References Cited

U.S. PATENT DOCUMENTS 558,972 A * 4/1896 Meyer .............................. 292/98
1,263,349 A * 4/1918 Holtzman ....................... 70/105
(Continued)

FOREIGN PATENT DOCUMENTS

DE 383644 C * 10/1923 .............. E05C 3/167
EP 1277902 1/2003
EP 1212501 11/2004

OTHER PUBLICATIONS

International Search Report and Written Opinion for PCT/US2012/045595 mailed Jan. 1, 2013.

*Primary Examiner* — Carlos Lugo
(74) *Attorney, Agent, or Firm* — Workman Nydegger

(57) ABSTRACT

The present invention includes door locks having a cam having three lobes, and to systems including such door locks. The outer lobes of the cam can limit the rotation of the cam. By limiting the rotation of the cam, the outer lobes can ensure that the cam is always ready for immediate activation. The outer lobes can also strike against outer pins of a locking mechanism to cause the cam to rotate with the locking mechanism when the locking mechanism is activated from the opposite side of the locking mechanism. The present invention also extends to methods of installing and using a door lock including three lobes.

14 Claims, 15 Drawing Sheets

(51) Int. Cl.
*E05B 15/00* (2006.01)
*E05B 15/10* (2006.01)
*F16H 25/14* (2006.01)
*E05C 3/00* (2006.01)
*E05B 63/00* (2006.01)
*E05C 3/04* (2006.01)

(52) U.S. Cl.
CPC ........ *Y10T 74/2101* (2015.01); *Y10T 292/1077* (2015.04)

(56) References Cited

U.S. PATENT DOCUMENTS

| | | | | |
|---|---|---|---|---|
| 1,383,128 A * | 6/1921 | Larsen | ................ | E05B 63/0017 70/134 |
| 1,437,992 A * | 12/1922 | Pike | ................ | 70/136 |
| 2,290,728 A * | 7/1942 | Best | ................ | E05B 55/12 292/1.5 |
| 2,650,121 A * | 8/1953 | Schlage | ................ | 292/167 |
| 2,781,656 A * | 2/1957 | Guzman | ................ | 70/136 |
| 2,854,839 A * | 10/1958 | Eads | ................ | 70/139 |
| 2,989,859 A * | 6/1961 | Eads | ................ | 70/116 |
| 3,011,817 A * | 12/1961 | Eads | ................ | 292/140 |
| 3,298,729 A * | 1/1967 | Russell et al. | ................ | 292/337 |
| 3,337,248 A * | 8/1967 | Russell et al. | ................ | 292/5 |
| 3,695,068 A * | 10/1972 | Eads et al. | ................ | 70/107 |
| 3,899,906 A * | 8/1975 | Bradstock | ................ | 70/139 |
| 4,126,341 A * | 11/1978 | Bradstock | ................ | 292/201 |
| 4,127,016 A * | 11/1978 | Ibsen | ................ | 70/92 |
| 4,218,903 A * | 8/1980 | Eads | ................ | 70/107 |
| 4,248,068 A * | 2/1981 | Esser | ................ | E05B 63/0017 292/142 |
| 4,322,958 A * | 4/1982 | Eigemeier | ................ | 70/107 |
| 4,387,918 A | 6/1983 | Dunphy | | |
| 4,604,878 A * | 8/1986 | Todd et al. | ................ | 70/139 |
| 4,663,950 A * | 5/1987 | Mascotte | ................ | 70/135 |
| 5,098,139 A * | 3/1992 | Larsson | ................ | 292/97 |
| 5,148,691 A * | 9/1992 | Wallden | ................ | 70/279.1 |
| 5,452,927 A * | 9/1995 | Uyeda | ................ | 292/202 |
| 5,622,065 A * | 4/1997 | Persiano | ................ | 70/139 |
| 6,247,342 B1* | 6/2001 | Lilas | ................ | 70/106 |
| 6,745,603 B1* | 6/2004 | Shaw | ................ | 70/278.1 |
| 7,296,448 B1* | 11/2007 | Shaw | ................ | 70/283 |
| 8,485,569 B2* | 7/2013 | Dynes et al. | ................ | 292/194 |
| 8,534,099 B2* | 9/2013 | Wheeler et al. | ................ | 70/100 |
| 2001/0010166 A1 | 8/2001 | Doucet | | |
| 2014/0265357 A1* | 9/2014 | Romero | ................ | 292/140 |

* cited by examiner

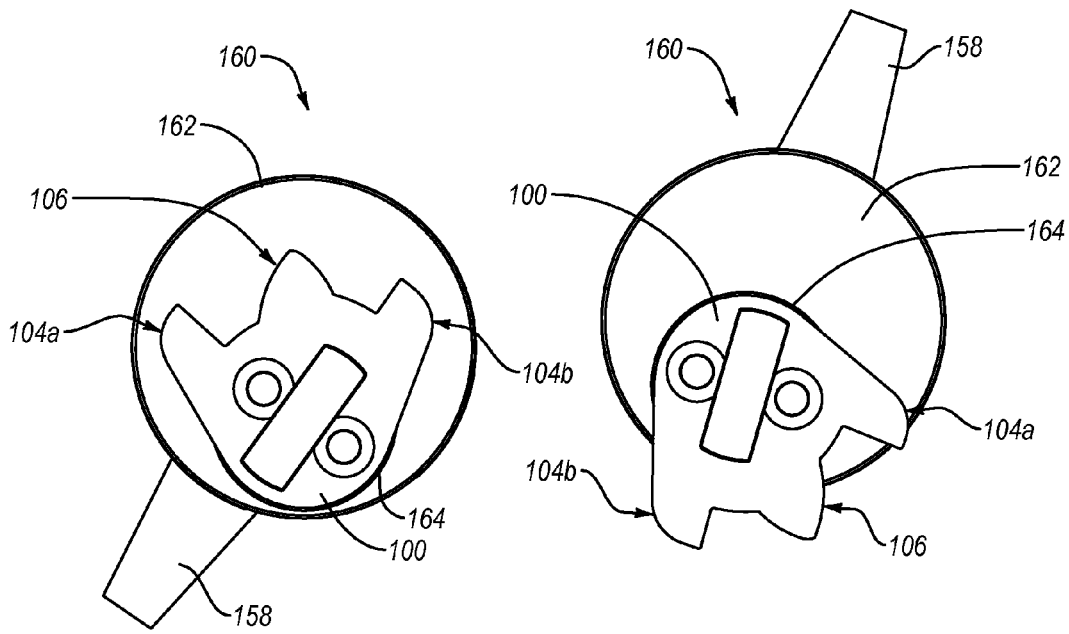
FIG. 4A                    FIG. 4B
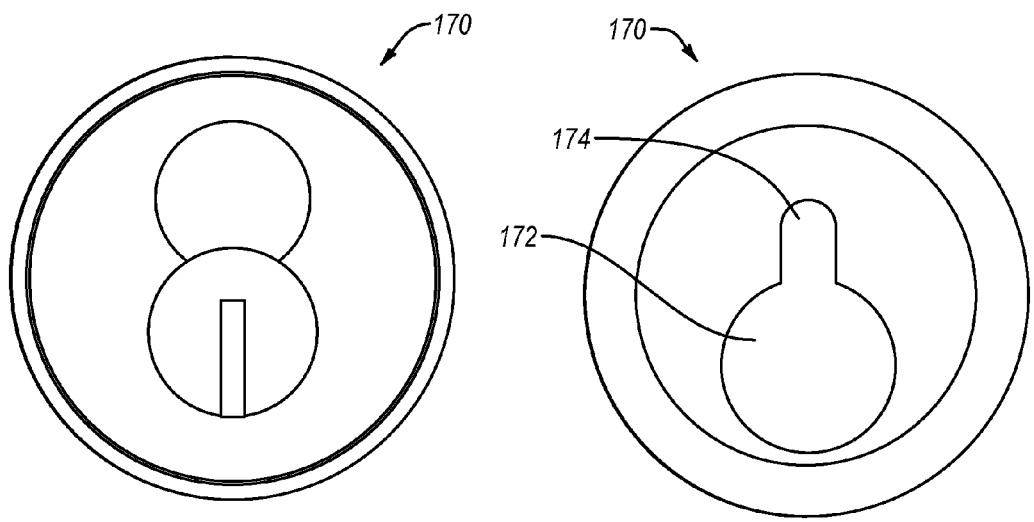
FIG. 5A                    FIG. 5B

CAM STYLE LOCKS AND SYSTEMS AND METHODS INCLUDING THE SAME

CROSS-REFERENCE TO RELATED APPLICATIONS

The present invention is 35 U.S.C. §371 National Stage application corresponding to PCT/US12/45595, filed on Jul. 5, 2012, entitled "Cam Style Locks and Systems and Methods Including the Same," which claims the benefit of and priority to U.S. Provisional Application No. 61/551,055, filed Oct. 25, 2011, entitled "CAM FOR CAM STYLE LOCKS." The entire content of each of the foregoing patent applications is incorporated by reference herein.

BACKGROUND OF THE INVENTION

1. Technical Field

The present disclosure relates generally to hardware for doors and other movable partitions. More particularly, the present disclosure relates to door locks including a cam having three lobes and to methods and systems including such door locks.

2. Background and Relevant Art

The Americans for Disabilities Act (ADA) and certain jurisdictions require certain hardware functions to ensure safe egress for the disabled from an office in the event of an emergency. Specifically, the ADA requires that hardware on accessible doors function without tight grasping, pinching, and/or twisting of the wrist. To allow for door lock operation without requiring a pinching action, some jurisdictions require a lever-shaped handle rather than a thumb latch. Furthermore, to allow for door lock operation without twisting of the wrist, some jurisdictions require a quarter turn to operate a lock rather than 360 degree (or more) rotation.

These requirements often bar the use of many typical door lock solutions. As such, these requirements often limit the choices available to designers for specifying hardware that is aesthetically appealing and consistent in appearance and function with other building hardware. For example, conventional locks that meet these requirements typically are aesthetically un-appealing and/or expensive. Furthermore, such conventional locks typically include complicated parts and/or installation procedures. In addition to the foregoing, conventional locks that meet these requirements are typically large and bulky. The size of such conventional locks often precludes them from use with thinner or narrow doors and partitions.

In particular, designers implementing resin-based or glass panels as doors or partitions may desire to mount the panel in a way that allows the panel to display its aesthetic properties. For instance, designers may desire to reduce the size and visibility of mounting hardware, such as a frame, supporting the panel. Unfortunately, many of the previously mentioned conventional locks are often too bulky or otherwise require the use of larger frames or mounting hardware.

For example, conventional locks may be thicker than desired, and thereby, require the designer to use a thicker panel or to use support hardware. Along similar lines, conventional locks may be wider than desired, and thereby, require extension into the edge of the panel or the use of wider supporting hardware. Such conventional locks may require modifications that are unsatisfactory to designers. For instance, the price of door panels is often proportional to the thickness, and thus, using thicker panels can increase the cost of the door or partition. Furthermore, using supporting hardware that is much thicker or wider than the panel, can adversely affect the aesthetics and/or structural integrity of the door.

Conventional MS-style locks are common, inexpensive, and thin enough for use with thinner doors. A typical MS style lock body includes a keyed mortise cylinder and a thumb turn mortise cylinder. Each of the mortise cylinders includes a single lobe cam that moves a pivoting locking mechanism between open and locked configurations upon rotation.

Unfortunately conventional MS-style locks do not meet all of the previously mentioned requirements. For example, conventional MS-style locks typically include a large free turning range where there is no activation of the locking mechanism. In other words, often times conventional MS-style locks require nearly 360 degrees of rotation of the thumb turn lever before the cam will engage the locking mechanism. Specifically, when the locking mechanism is activated from the keyed side (i.e., the outside of the door), the conventional MS style cam and the thumb turn lever on the inside of the door do not move with the keyed side. As a result, the thumb turn lever is not being in position to be immediately activated and requires an operator to rotate the thumb turn lever nearly 360 degrees before the cam engages the locking mechanism.

Accordingly, there are a number of disadvantages in conventional locks that can be addressed.

BRIEF SUMMARY OF THE INVENTION

Implementations of the present invention overcome one or more of the foregoing or other problems in the art by providing an aesthetically pleasing lock with improved functionality. In particular, one or more implementations include a cam-style lock having a cam with three lobes. The tri-lobe cam can restrict movement of a first actuator (e.g., thumb turn lever) such that only approximately a fourth of a turn of the first actuator is needed to lock or unlock the lock. Furthermore, the tri-lobe cam can cause the first actuator to move with a second actuator (e.g., keyed mortise cylinder) such that the first actuator is always in a position for immediate locking or unlocking of the lock.

For example, one implementation of a lock assembly includes a locking mechanism comprising a pivot plate having a center pin positioned between first and second outer pins. The lock assembly further includes a lock body and a pivot rod pivotally coupling the pivot plate to the lock body. Also, the lock assembly includes a tri-lobe cam including a center lobe positioned between a first outer lobe and a second outer lobe. The tri-lobe cam is configured to engage the center pin and the first and second outer pins to move the locking mechanism between an unlocked position and a locked position.

Additionally, a partition for selectively dividing a space includes a panel having a first side and a second opposing side. The partition further includes a locking mechanism mounted in the panel. The locking mechanism includes a first side and a second opposing side. The partition also includes a first actuator and a second actuator. The first actuator is positioned on the first side of the panel and coupled to the first side of the locking mechanism. The second actuator is positioned on the second side of the panel and coupled to the second side of the locking mechanism. Also, the partition includes a tri-lobe cam rotationally coupled to the first actuator. The tri-lobe cam includes a center lobe positioned between a first outer lobe and a second outer lobe. The first outer lobe and the second outer lobe are sized and configured to limit the rotation of the tri-lobe cam and the first actuator to a range of approximately 90 degrees.

In addition to the foregoing, a tri-lobe cam for actuating a locking mechanism includes a center lobe, a first outer lobe, and a second outer lobe. The first outer lobe is positioned on a first side of the center lobe. The second outer lobe is positioned on a second side of the center lobe. The first outer lobe includes a planar inner surface facing the center lobe. The second outer lobe includes a planar inner surface facing the center lobe.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not necessarily drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 4A illustrates the tri-lobe cam of FIG. 1A secured to a thumb turn assembly according to one or more implementations of the present invention;

FIG. 4B illustrates the tri-lobe cam and thumb turn assembly of FIG. 4A, albeit rotated;

FIG. 5A illustrates a front view of a keyed mortise cylinder according to one or more implementations of the present invention;

FIG. 5B illustrates a rear view of the keyed mortise cylinder of FIG. 5A;

DETAILED DESCRIPTION OF THE PREFERRED EMBODIMENTS

Figure 1A:
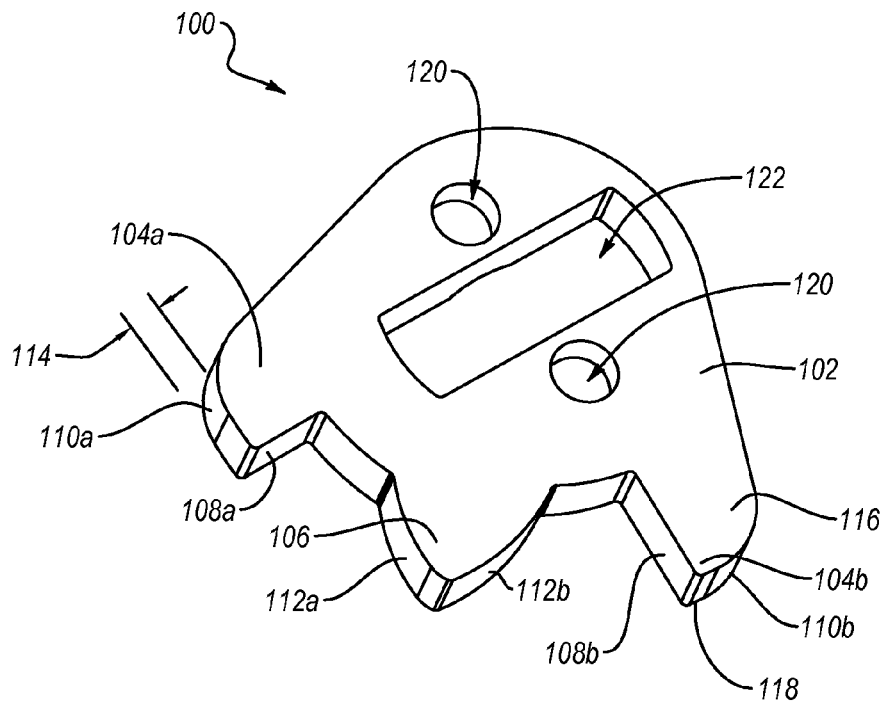
FIG. 1A illustrates a perspective view of a tri-lobe cam according to one or more implementations of the present invention.

Implementations of the present invention are directed to an aesthetically pleasing lock with improved functionality. In particular, one or more implementations include a cam-style lock having a cam with three lobes. The tri-lobe cam can restrict movement of a first actuator (e.g., thumb turn lever) such that only approximately a fourth of a turn of the first actuator is needed to lock or unlock the lock. Furthermore, the tri-lobe cam can cause the first actuator to move with a second actuator (e.g., keyed mortise cylinder) such that the first actuator is always in a position for immediate locking or unlocking of the lock.

In particular, a lock according to one or more implementations of the present invention includes a cam having two outer lobes in addition to a center lobe. In such implementations, the two outer lobes can hook the cam to the locking mechanism. As such, the outer lobes can move the locking mechanism between locked and unlocked configurations.

In one or more implementations, the outer lobes can ensure that the tri-lobe cam (and associated actuator) remains in alignment with the locking mechanism. Maintaining alignment with the locking mechanism can ensure that approximately a fourth of a turn of the associated actuator will lock or unlock the lock at all times. In other words, the outer lobes of the tri-lobe cam can prevent the need to rotate the associated actuator more than a fourth of a turn (such as 270 to 360 or more degrees) to engage the locking mechanism.

Along related lines, the outer lobes can cause the tri-lobe cam (and associated actuator) to move with the locking mechanism as the locking mechanism is moved between locked and unlocked configurations (such as by an opposing actuator). For example, when an operator unlocks the lock from the outside of the door using an opposing actuator (such as a key in a keyed mortise cylinder), the outer lobes of the tri-lobe cam can rotate an associated actuator (such as a thumb turn lever) on the inside of the door to the unlocked position. Thus, in this example, the tri-lobe cam can ensure that further rotation of the associated actuator will immediately lock the lock. Similarly, when an operator locks the lock from the outside of the door using the opposing actuator, the outer lobes of the tri-lobe cam can rotate the associated actuator on the inside of the door to the locked position. Thus, in this example, the tri-lobe cam can ensure that further rotation of the associated actuator will immediately unlock the lock.

The center lobe can have a shape so as to push a center pin of the locking mechanism to release the movement of the locking mechanism. The shape of the center lobe can allow the tri-lobe cam to smoothly interact with the locking mechanism, including when the tri-lobe cam is moved by the locking mechanism. In particular, the shape of the center lobe can ensure that the center lobe stay clears of the locking mechanism when in the locked and opened positions.

In addition to the foregoing, one or more implementations of a tri-lobe cam can replace a conventional cam in a MS style lock. Thus, the tri-lobe cam can improve the functionality of a conventional MS style lock. In particular, the tri-lobe cam can ensure that the lock meets ADA and other requirements. Furthermore, the tri-lobe cam can provide such benefits, while maintaining the advantages of the conventional MS style locks, such as size, price, and aesthetics. One will appreciate in light of the disclosure herein, however, that tri-lobe cams of the present invention can also function with other types and styles of locks other than MS style locks.

Figure 1B:
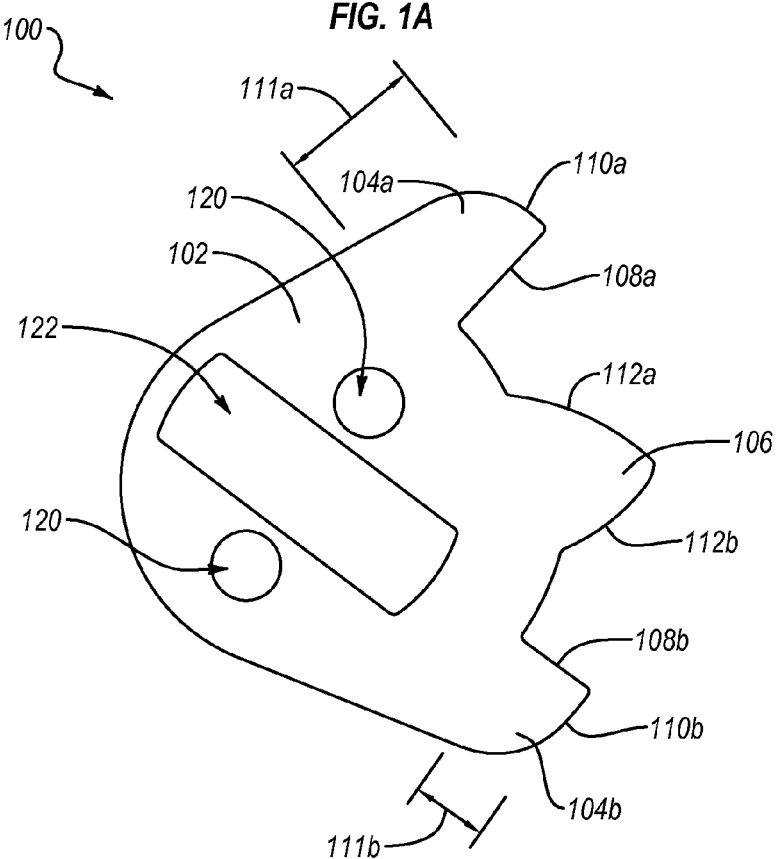
FIG. 1B illustrates a front view of the tri-lobe cam of FIG. 1A.

Referring now to the Figures, FIGS. 1A and 1B illustrate perspective and front views, respectively, of one implementation of a tri-lobe cam 100. As an initial matter, FIGS. 1A and 1B illustrate a tri-lobe cam 100 for use in a left-handed door configuration. One will appreciate in light of the disclosure herein that a tri-lobe cam for a right-handed door configuration can comprise a mirror image of the tri-lobe cam 100. Thus, in one or more implementations the tri-lobe cam 100 is hand specific. In alternative implementations, tri-lobe cams according to one or more implementations of the present invention can function with both left-handed and right-handed doors, although such is not required.

FIGS. 1A and 1B illustrate that the tri-lobe cam 100 can comprise a body 102. The body 102 can include a pair of outer lobes 104a, 104b and a center lobe 106. As explained in greater detail below, all three lobes of the tri-lobe cam 100 can sequentially engage and disengage a locking mechanism to consecutively pivot the locking mechanism between locked and unlocked configurations.

As illustrated by FIGS. 1A and 1B, each of the lobes 104a, 104b, 106 can protrude generally away from the body 102 of the tri-lobe cam 100. The length of the lobes 104a, 104b, 106 can vary based on the size and/or configuration of the locking mechanism with which they are to be used. In one or more implementations, the distance each lobe extends from the body 102 differs. In alternative implementations, one or more of the lengths of the lobes 104a, 104b, 106 is equal.

The first outer lobe 104a can comprise an inner surface 108a and an outer surface 110a. Similarly, the second outer lobe 104b can also comprise an inner surface 108b and an outer surface 110b. In one or more implementations, the inner surfaces 108a, 108b are both planar as shown by FIGS. 1A and 1B. In alternative implementations, the inner surfaces 108a, 108b curve along their length or otherwise have a non-planar geometry. In any event, the inner surface 108a of the first outer lobe 104a faces the center lobe 106. Similarly, the inner surface 108b of the second outer lobe 104b faces the center lobe 106.

FIGS. 1A and 1B illustrate that the lengths of the inner surfaces 108a, 108b vary. In particular, FIG. 1B illustrates that the length 111a of the inner surface 108a of the first outer lobe 104a is greater than the length 111b of the inner surface 108b of the second outer lobe 104b. For example, in one or more implementations, the length 111a of the inner surface 108a is between 1.25 and 1.75 times greater than the length 111b of the inner surface 108b. In still further implementations, the length 111a of the inner surface 108a is approximately 1.5 times greater than the length 111b of the inner surface 108b. In alternative implementations, the length 111a of the inner surface 108a is approximately equal to the length 111b of the inner surface 108b.

In any event, as explained in greater detail below, the sizes and shapes of the outer lobes 104a, 104b can function to allow the tri-lobe cam 100 to prevent over rotation of the tri-lobe cam 100 or to otherwise maintain alignment of the tri-lobe cam 100 with a locking mechanism as explained below. Furthermore, the sizes and shapes of the outer lobes 104a, 104b can function to cause the tri-lobe cam 100 to move with a locking mechanism as it pivots or otherwise moves between locked and unlocked configurations.

The center lobe 106 can comprise a first surface 112a (i.e., the surface facing the first outer lobe 104a) and a second surface 112b (i.e., the surface facing the second outer lobe 104b). As shown by FIGS. 1A and 1B, the first and second surfaces 112a, 112b can each have a radius or curvature. In particular, the first and second surfaces 112a, 112b can include differing curvature and lengths. For example, FIGS. 1A and 1B illustrate that the first surface 112a has a greater length than the second surface 112b. Thus, in one or more implementations the center lobe 106 is asymmetrical. In one or more implementations, the differing curvature and/or lengths of the first and second surfaces 112a, 112b can help ensure that the center lobe 106 smoothly interacts with the locking mechanism. In alternative implementations, the first and second surfaces 112a, 112b of the center lobe 106 can have the same curvature and/or length. Thus, in one or more alternative implementations, the center lobe 106 is symmetrical.

In one or more implementations, the body 102 comprises stainless steel. In alternative implementations, the body 102 can comprise any number of suitable materials. For example, the material of the body 102 can comprise a high strength and low weight material. Furthermore, the body 102 can have a thickness 114 extending between a front surface 116 and a rear surface 118. In one or more implementations, the thickness 114 is between about 1.5 millimeters and about 3 millimeters. In alternative implementations, the thickness of the body 102 is less than 1.5 millimeters or greater than 3 millimeters.

In any event, as shown best by FIG. 1A, in one or more implementations the tri-lobe cam 100 can comprise a uniform thickness 114. In alternative implementations, the thickness of the tri-lobe cam 100 can vary. For example, in one or more implementations the lobes 104a, 104b, 106 have a smaller thickness than the body 102 or vice versa.

FIGS. 1A and 1B further illustrate that the body 102 can include one or more mounting holes 120. The mounting holes 120 can accommodate fasteners for securing the tri-lobe cam 100 to an actuator (such as a thumb turn lever). In addition to mounting holes 120, the body 102 can further include a mounting slot 122. The mounting slot 122 can house a protrusion from an actuator and can ensure that the tri-lobe cam 100 does not rotate relative to the associated actuator. In one or more implementations, the mounting slot 122 has a rectilinear shape as shown in FIGS. 1A and 1B. In alternative implementations, the mounting slot can comprise more than one circular or other shaped holes that function to prevent rotation of the tri-lobe cam 100 relative to an associated actuator.

As previously mentioned, the tri-lobe cam 100 can work in conjunction with a locking mechanism. FIGS. 2A-3F illustrate a MS-style locking mechanism with which the tri-lobe cam 100 can function. One will appreciate that this is only one type of locking mechanism with which the tri-lobe cam 100 can function.

Figure 2A:
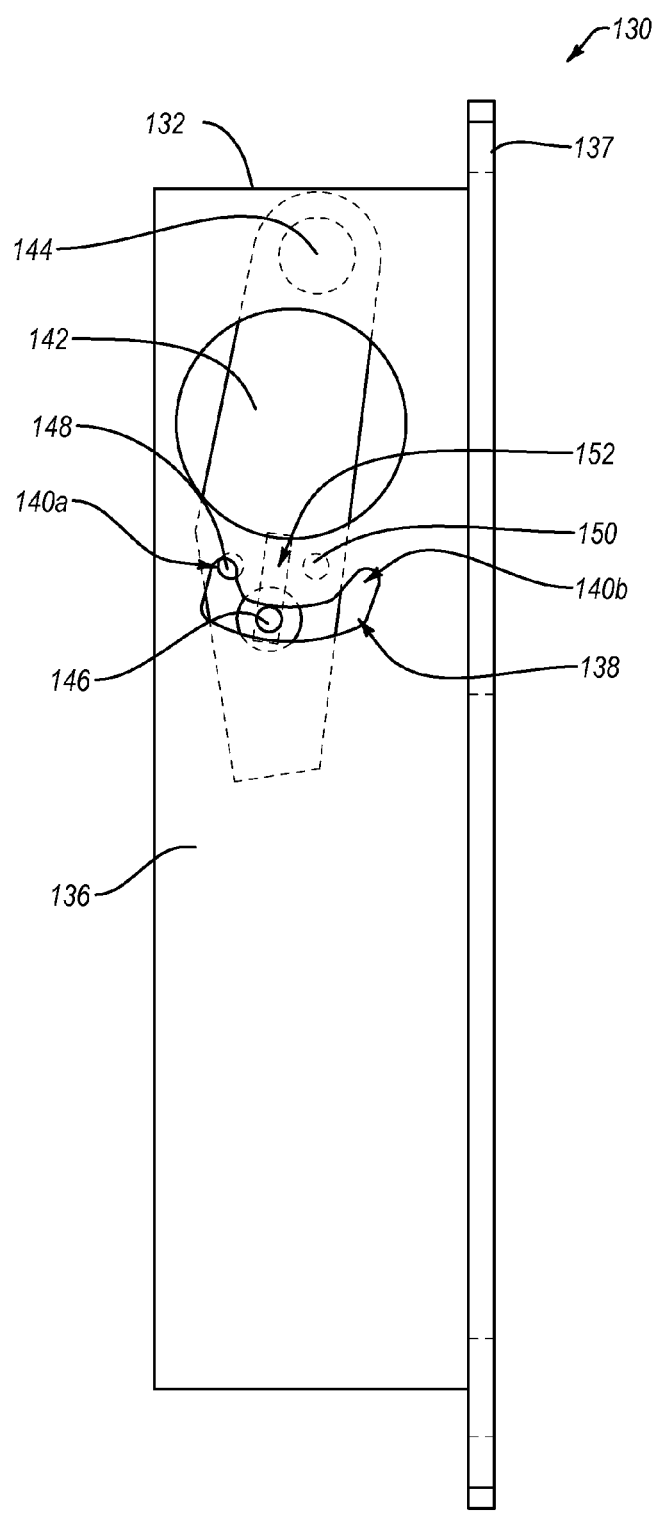
FIG. 2A illustrates a side view of a locking mechanism according to one or more implementations of the present invention.
Figure 2B:
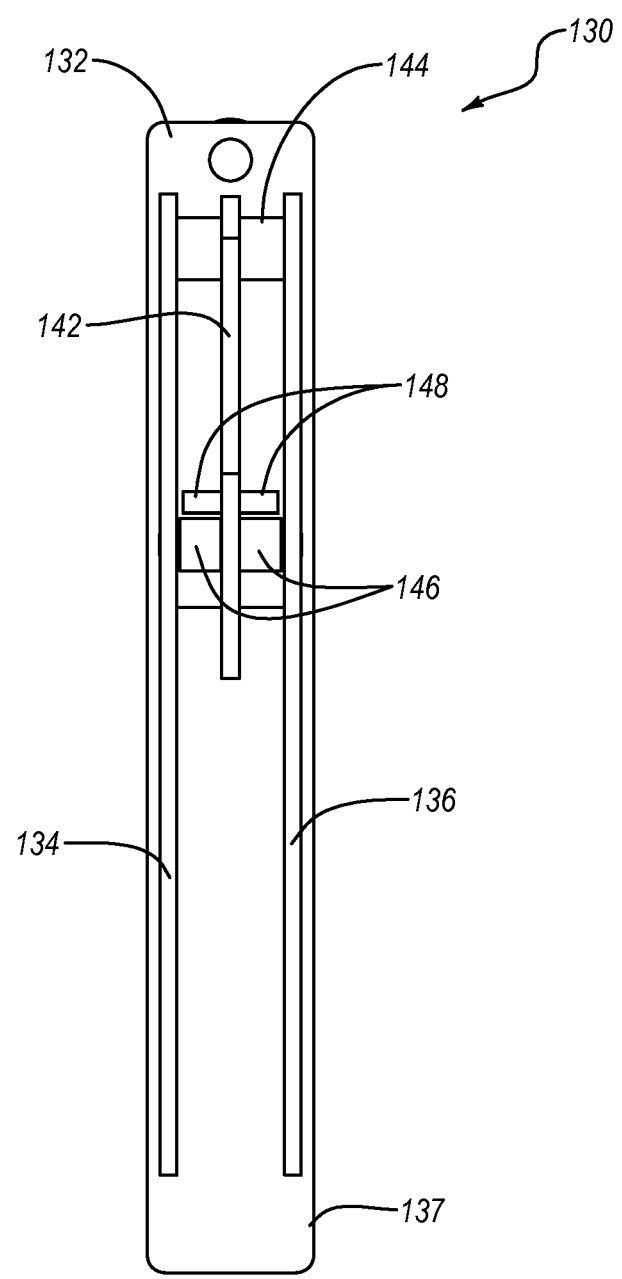
FIG. 2B illustrates a back view of the locking mechanism of FIG. 2A.

In particular, FIGS. 2A and 2B illustrates side and back views, respectively, of a MS-style locking mechanism 130. The MS-style locking mechanism 130 includes a body 132. The body 132 can include a first side wall 134, a second opposing side wall 136, and a face plate 137. Each of the first and second side walls 134, 136 can include slide channel 138. The slide channel 138 can extend generally across the side walls 134, 136. Each end of the slide channel 138 can include a stop-slot 140a, 140b. The stop-slots 140a, 140b can extend from the slide channel 138 generally upward. In alternative implementations, the stop-slots 140a, 140b can extend generally downward. More specifically, the side walls 136, 138 can each include an open stop-slot 140b and a locked stop-slot 140a. As explained in greater detail below, the open stop-slot 140b can secure or maintain the locking mechanism 130 in the unlocked configuration, while the locked stop-slot 140a can secure or maintain the locking mechanism 130 in the locked configuration.

The locking mechanism 130 can further include a pivot plate 142. The pivot plate 142 is secured between the first and second side walls 134, 136 by a pivot rod 144. The pivot rod 144 allows the pivot plate 142 to pivot between a locked configuration and an unlocked configuration.

The locking mechanism 130 further includes a guide pin 146, a first outer pin 148, and a second outer pin 150. The guide pin 146 is positioned between the first and second pins 148, 150. The guide pin 146 extends into the slide channel 138 of the side walls 134, 136. In particular, smaller diameter extensions on each end of the guide pin 146 can extend into the slide channel 138. The first and second outer pins 148, 150 on the other hand can reside between the inner surfaces of the first and second side walls 134, 136.

As the pivot plate 142 pivots on the pivot rod 144, the guide pin 146 moves between the locked stop-slot 140a and the open stop-slot 140b. In one or more implementations, the guide pin 146 is positioned within a release groove 152 in the pivot plate 142. The release groove 152 can allow the guide pin 146 to move out of the stop-slots 140a, 140b to release the locking mechanism 130 from the unlocked and locked configurations.

In one or more implementations the guide pin 146 is biased upward (i.e., into the stop-slots 140a, 140b). For example, a biasing mechanism (such as one or more springs) can bias the guide pin 146 upward. This can help ensure that the locking mechanism 130 is not incidentally released from either the locked stop-slot 140a or the open stop-slot 140b.

The first and second pins 148, 150 on the other hand are rigidly secured to, or through, the pivot plate 142 such that they do not move relative to the pivot plate 142. The first and second pins 148, 150 allow a cam to move or pivot the pivot plate 142 between the locked and unlocked configurations. One will appreciate that when in the locked position, the guide pin 146 is positioned within the locked stop-slot 140a. The locked stop-slot 140a can prevent the guide pin 146, and thus the pivot plate 142, from moving or rotating until released by movement of the guide pin 146 out of the release groove 152. On the other hand, when in the unlocked position, the guide pin 146 is positioned within the open stop-slot 140b. The open stop-slot 140b can similarly prevent the guide pin 146, and thus the pivot plate 142, from moving or rotating until released by movement of the guide pin 146 out of the release groove 152.

Referring now to FIGS. 3A-3F, various views of the locking mechanism 130 and tri-lobe cam 100 moving between the locked and unlocked configurations, and vice versa, are shown. Beginning with FIG. 3A, a view of the locking mechanism 130 in the unlocked configuration is shown. In particular, the guide pin 146 is positioned within the open stop-slot 140b, and the pivot plate 142 is positioned at its highest and front most position. As shown, when in the unlocked configuration, the tri-lobe cam 100 is prevented from being turned out of alignment with the locking mechanism 130.

As used herein, the term "in alignment with the locking mechanism" refers to positions of the tri-lobe cam 100 in which the each of the first and second pins 148, 150 and the guide pin 146 are positioned between the inner surfaces 108a, 108b of the first and second outer lobes 104a, 104b. Additionally or alternatively, the term "in alignment with the locking mechanism" refers to positions of the tri-lobe cam 100 in which the center lobe 106 faces the guide pin 146 and is positioned between the first and second pins 148, 150.

Thus, "out of alignment with the locking mechanism" refers to positions of the tri-lobe cam 100 in which at least one of the first and second pins 148, 150 and the guide pin 146 is positioned outside of the inner surfaces 108a, 108b of the first and second outer lobes 104a, 104b (or a line extending from the inner surfaces 108a, 108b). Additionally or alternatively, the term "out of alignment with the locking mechanism" refers to positions of the tri-lobe cam 100 in which the center lobe 106 does not face the guide pin 146 and is positioned to the far side of either of the first or second pins 148, 150.

Figure 3A:
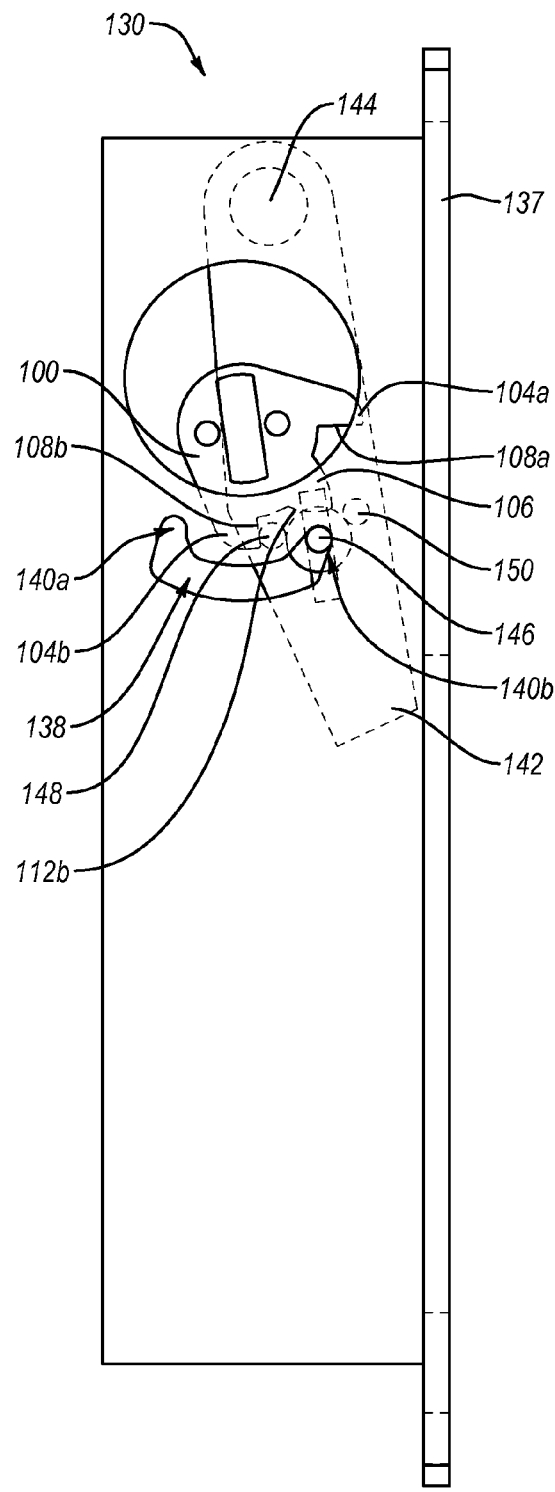
FIG. 3A illustrates a side view of the tri-lobe cam of FIG. 1A and the locking mechanism of FIG. 2A in an unlocked configuration.

FIG. 3A illustrates that when in the unlocked position the second outer lobe 104b prevents the tri-lobe cam 100 from moving out of alignment with the locking mechanism 130. In particular, the tri-lobe cam 100 is prevented from rotating further counter-clockwise because the inner surface 108b of the second outer lobe 104b abuts against the first pin 148. The first pin 148 is prevented from further counter-clockwise rotation by the position of the guide pin 146 within the open stop-slot 140b.

Figure 3B:
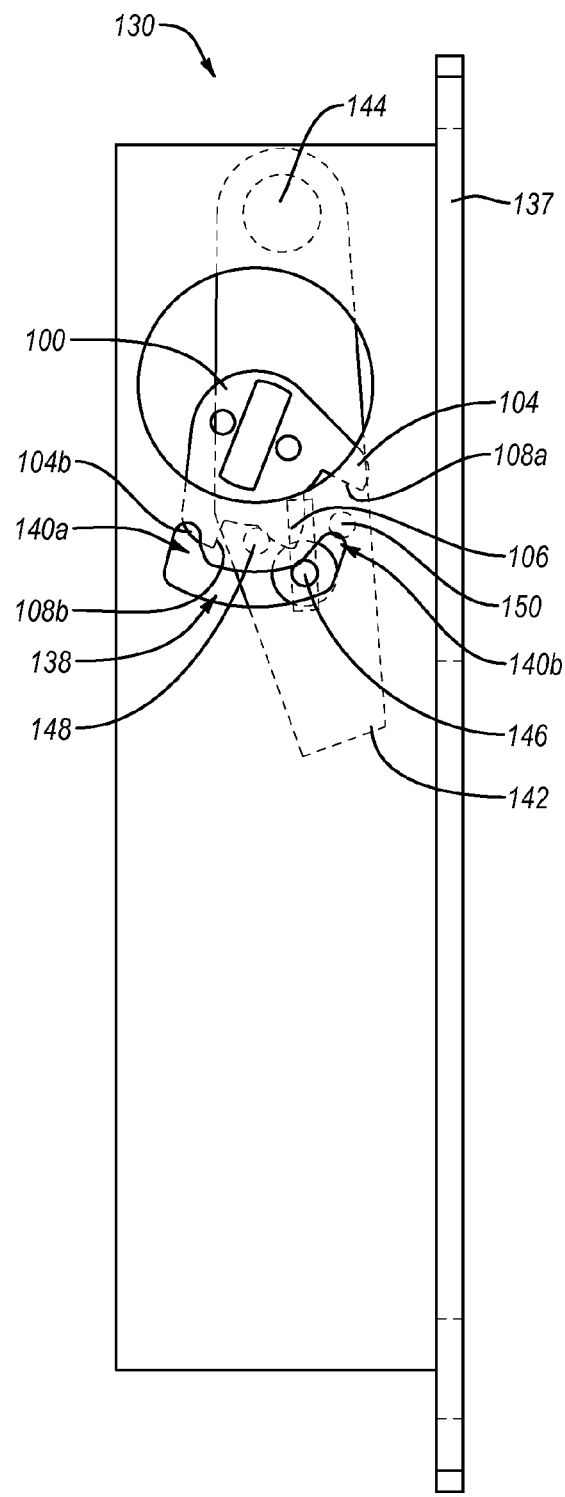
FIG. 3B illustrates a side view of the tri-lobe cam and locking mechanism of FIG. 3A just after rotation out of the unlocked configuration.
Figure 3C:
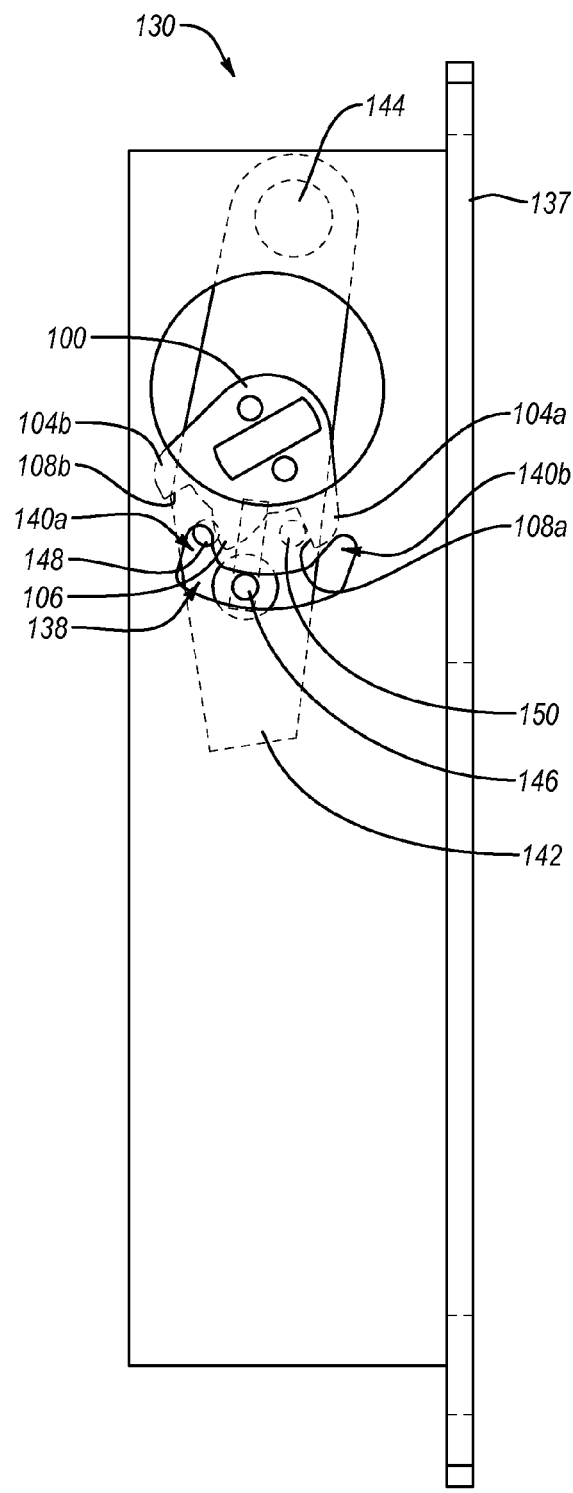
FIG. 3C illustrates a side view of the tri-lobe cam and locking mechanism of FIG. 3B after further rotation toward a locked configuration.
Figure 3D:
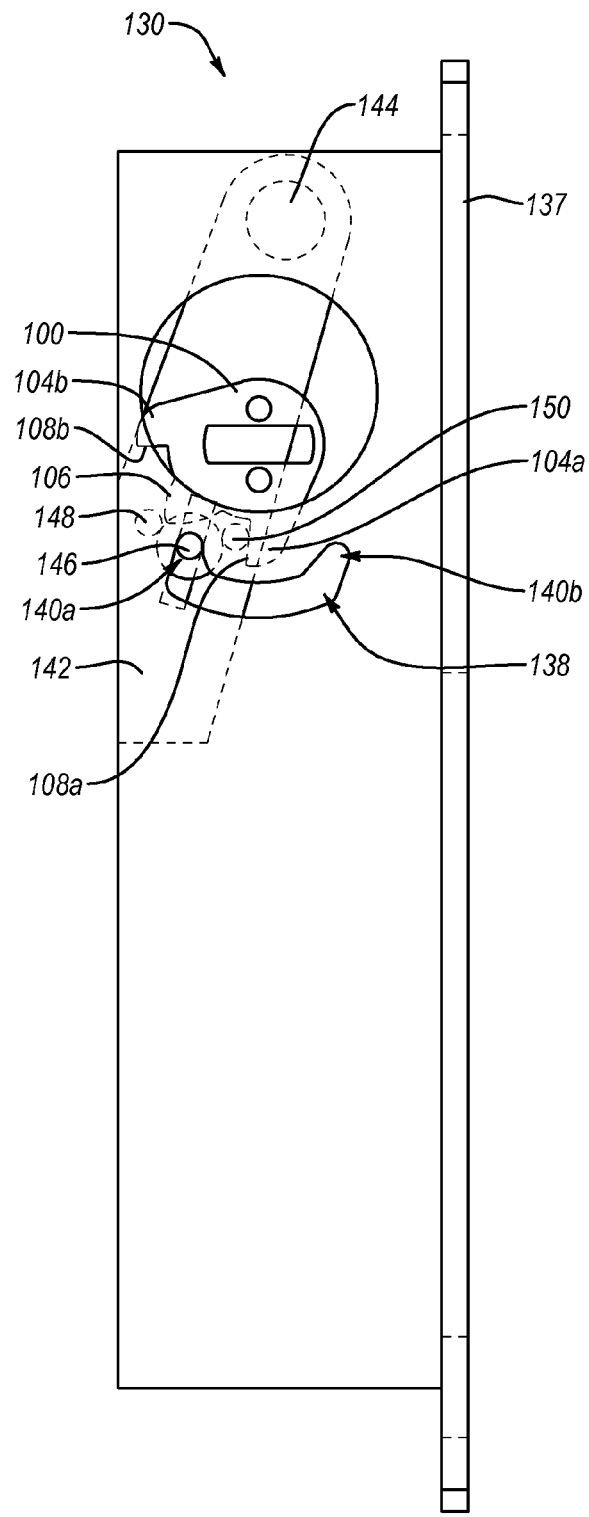
FIG. 3D illustrates a side view of the tri-lobe cam and locking mechanism of FIG. 3C in a locked configuration.

By preventing the tri-lobe cam 100 from moving out of alignment with the locking mechanism 130 when in the unlocked configuration, the second outer lobe 104b ensures that approximately a fourth of a turn of the tri-lobe cam 100 (and thus the associated actuator) will move the locking mechanism 130 from the unlocked configuration (FIG. 3A) to the locked configuration (FIG. 3D). In other words, clockwise rotation of the tri-lobe cam 100 (and the associated actuator) will immediately cause the locking mechanism 130 to move toward the locked configuration. Thus, the tri-lobe cam 100 (and the associated actuator) will not need to first pass through a dead zone of rotation in which rotation of the tri-lobe cam 100 (and the associated actuator) has no effect on the position of the locking mechanism 130.

To move the locking mechanism 130 out of the unlocked configuration, an operator can rotate an associated actuator (and thus the tri-lobe cam 100) clockwise. Referring now to FIG. 3B, clockwise rotation of the tri-lobe cam 100 causes the center lobe 106 to press down on the guide pin 146, thereby causing the guide pin 146 to overcome the biasing force and exit the open slot stop 140b. Once the guide pin 146 is released from the open slot stop 140b, the guide pin 146 is free to move along the slide channel 138.

Further rotation of the tri-lobe cam 100 (as shown by a comparison of FIGS. 3B and 3C) causes the locking mechanism 130 to rotate clockwise. In particular, the center lobe 106 can press against the first pin 148 to rotate the pivot plate 142 clockwise. Additionally or alternatively, the inner surface 108a of the first outer lobe 104a can press against the second pin 150 to rotate the pivot plate 142 clockwise.

Once the guide pin 146 moves below the closed stop-slot 140a, the biasing force automatically moves the guide pin 146 into the closed stop-slot 140a as shown in FIG. 3D. When the guide pin 146 is in the closed stop-slot 140a, the locking mechanism 130 is in the locked configuration. With the guide pin 146 in the closed stop-slot 140a, rotation of the pivot plate 142 and the second pin 150 is prevented.

FIG. 3D illustrates that when in the locked position, the first outer lobe 104a prevents the tri-lobe cam 100 from moving out of alignment with the locking mechanism 130. In particular, the tri-lobe cam 100 is prevented from rotating further clockwise because the inner surface 108a of the first outer lobe 104a abuts against the now fixed second pin 150. As shown by FIG. 3D, when in the locked position or configuration, the pivot plate 142 is positioned at its lowest and rear most position.

By preventing the tri-lobe cam 100 from moving out of alignment with the locking mechanism 130 when in the locked configuration, the first outer lobe 104a ensures that approximately a fourth of a turn of the tri-lobe cam 100 (and thus the associated actuator) will move the locking mechanism 130 from the locked configuration (FIG. 3D) to the unlocked configuration (FIG. 3A). In other words, counter-clockwise rotation of the tri-lobe cam 100 (and the associated actuator) will immediately cause the locking mechanism 130 to move toward the unlocked configuration.

Thus, the tri-lobe cam 100 (and the associated actuator) will not need to first pass through a dead zone of rotation in which rotation of the tri-lobe cam 100 (and the associated actuator) has no effect on the position of the locking mechanism 130. In this way, the rotation of the tri-lobe cam 100 (and the associated actuator) is limited to around 90 degrees and the tri-lobe cam 100 (and the associated actuator) is always in position for immediate activation. Specifically, the first outer lobe 104a and the second outer lobe 104b are sized and configured to limit the rotation of the tri-lobe cam 100 (and the associated actuator) within a range of approximately 90 degrees. Accordingly, implementations of the present invention provide the benefit of maintaining the tri-lobe cam 100 (and the associated actuator) in a position where it may always be immediately activated.

Figure 3E:
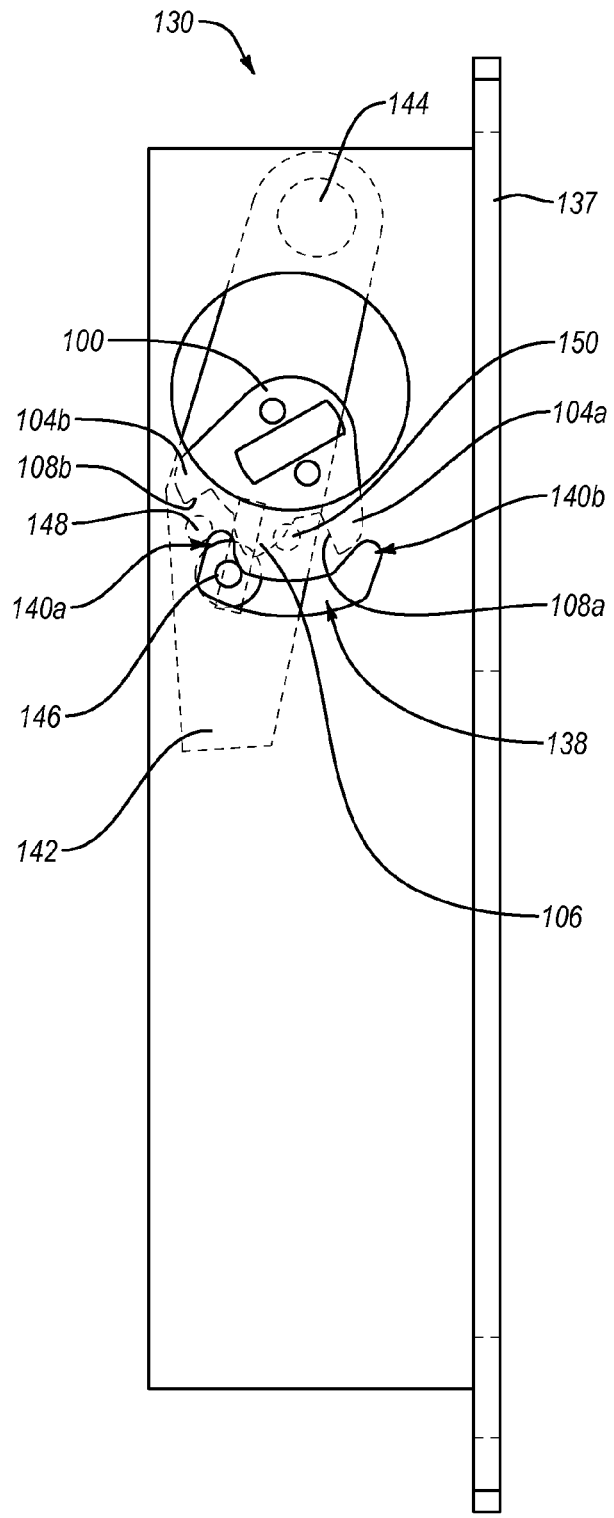
FIG. 3E illustrates a side view of the tri-lobe cam and locking mechanism of FIG. 3D just after rotation out of the locked configuration.

To move the locking mechanism 130 out of the locked configuration, an operator can rotate an associated actuator (and thus the tri-lobe cam 100) counter-clockwise. Referring now to FIG. 3E, counter-clockwise rotation of the tri-lobe cam 100 causes the center lobe 106 to press down on the guide pin 146, thereby causing the guide pin 146 to overcome the biasing force and exit the locked stop-slot 140a. Once the guide pin 146 is released from the locked stop-slot 140a, the guide pin 146 is free to move along the slide channel 138.

Further counter-clockwise rotation of the tri-lobe cam 100 (as shown by a comparison of FIGS. 3E and 3F) causes the pivot plate 142 to rotate counter-clockwise about the pivot rod 144. In particular, the center lobe 106 can press against the second pin 150 to rotate the pivot plate 142 counter-clockwise. Additionally or alternatively, the inner surface 108b of the second outer lobe 104b can press against the first pin 148 to rotate the pivot plate 142 counter-clockwise.

Once the guide pin 146 moves below the open stop-slot 140b, the biasing force automatically moves the guide pin 146 into the open stop-slot 140a as shown in FIG. 3A. When the guide pin 146 is in the open stop-slot 140b, the locking mechanism 130 is in the unlocked configuration. At this point, rotation of the pivot plate 142 and the first and second pins 148, 150 is prevented.

In addition to ensuring that the tri-lobe cam 100 stays aligned with the locking mechanism 130, and is not turned too far, the lobes 104a, 104b, 106 can cause the tri-lobe cam 100 to rotate with the locking mechanism 130 when activated by another cam or actuator. In other words, when an opposing actuator (such as a key from the outside of the door) causes the pivot plate 142 to rotate, the lobes 104a, 104b, 106 can cause the tri-lobe cam 100 to similarly rotate. For example, when the locking mechanism 130 is moved by pressing against the pins 146, 148, 150 on the opposite side of the locking mechanism 130, the resulting movement of the pins 146, 148, 150 will press against one or more of the lobes 104a, 104b, 106 so that the tri-lobe cam 100 moves into a position to be immediately activated.

Figure 3F:
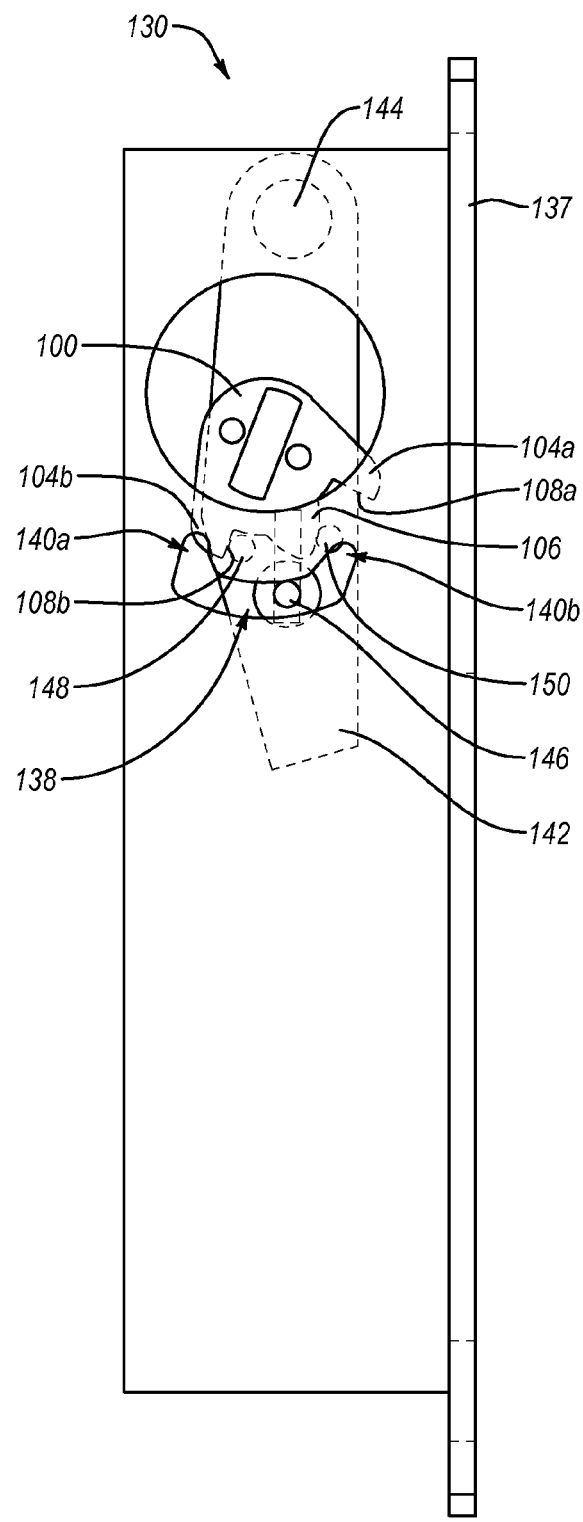
FIG. 3F illustrates a side view of the tri-lobe cam and locking mechanism of FIG. 3E after further rotation toward an unlocked configuration.

For example, referring to FIGS. 3A and 3F, movement of the guide pin 146 from the open stop-slot 140b by an opposing actuator automatically causes the first pin 148 to rotate clockwise. Clockwise rotation of the first pin 148 causes the first pin 148 to push against the inner surface 108b of the second outer lobe 104b, thereby rotating the tri-lobe cam 100. Continued clockwise rotation of the locking mechanism 130 by an opposing actuator causes the first pin 148 and/or second pin 150 to eventually move the tri-lobe cam 100 to the locked position shown in FIG. 3D. With the tri-lobe cam 100 (and any associated actuator) in the locked position (FIG. 3D), the three-lobe cam 100 is in position to immediately move the locking mechanism 130 back to the position shown in FIG. 3B upon counter-clockwise rotation. In other words, one or more of the center lobe 106, first outer lobe 104a, and the second outer lobe 104b are configured to cause the tri-lobe cam 100 (and an associated actuator) to move between a locked position (FIG. 3D) and an unlocked position (FIG. 3A) as a second actuator moves the locking mechanism 130 between a locked position (FIG. 3D) and an unlocked position (FIG. 3D).

Thus, in this example, the tri-lobe cam 100 can ensure that rotation of the associated actuator will immediately unlock the lock. Similarly, when an operator unlocks the locking mechanism 130 using an opposing actuator, the pins 148, 150 can engage the outer lobe(s) 148, 150 of the tri-lobe cam 100 to rotate the tri-lobe cam 100 (and associated actuator) to the unlocked position (FIG. 3A). Thus, in this instance, the tri-lobe cam 100 can ensure that rotation of the associated actuator will immediately lock the lock. In particular, the tri-lobe cam 100 is maintained in position to immediately rotate the locking mechanism 130 when the locking mechanism 130 is in the locked position (FIG. 3D) and the unlocked position (FIG. 3A).

As previously mentioned, an operator can use an actuator to rotate the tri-lobe cam 100. For example, FIGS. 4A and 4B illustrate an actuator (i.e., thumb turn lever) 158 associated with the tri-lobe cam 100. As used herein, the term "associated" components rotationally locked relative to each other. Thus, the thumb turn lever 158 is associated with the tri-lobe cam 100 because rotation of the thumb turn lever 158 will cause the same rotation of the tri-lobe cam 100, and vice versa.

FIGS. 4A and 4B further illustrate that an actuator assembly 160 can comprises a cylinder 162, an actuator (in this case a thumb turn lever 158), and a connecting pivot shaft 164. Both the thumb turn lever 158 and the tri-lobe cam 100 can attach, and rotationally lock, to the connecting pivot shaft 164. The connecting pivot shaft 164 in turn can rotate relative to the cylinder 162. The cylinder 162 can serve to attach the actuator assembly 160 to a side wall 134, 136 of the locking mechanism 100 (see FIG. 2B).

FIG. 4A shows the tri-lobe cam 100 is positioned so that each lobe 104a, 104b, 106 is within the diameter of the cylinder 162. This position is used during the installation of the actuator assembly 160 as will be further described below. FIG. 4B shows the position of the tri-lobe cam 100 when the lock is in the unlocked position according to the above described implementation of the invention.

One will appreciate in light of the disclosure herein that a thumb turn lever is only one type of actuator that a user can associate with the tri-lobe cam 100. For example, in alternative implementations the associated actuator can comprise a keyed mortise cylinder, a latch handle, a door knob, or other mechanism.

Implementations of the present invention further include an opposing actuator. The opposing actuator can connect to an opposing side of the locking mechanism 130 relative to the associated actuator. For example, FIGS. 5A-5B illustrate one implementation of an opposing actuator. Specifically, FIGS. 5A and 5B illustrate a keyed mortise cylinder 170. In alternative implementations, the opposing actuator can comprise a thumb turn lever, a latch handle, a door knob, or other mechanism.

As shown by FIG. 5B, in one or more implementations the opposing actuator is associated with a cam 172 having a single lobe 174. The single lobe 174 can engage and disengage the locking mechanism 130. In particular, when rotated, the lobe 174 simultaneously presses down on the guide pin 146 while pressing against either the first or second pin 148, 150 to move the locking mechanism 130 in the corresponding direction. This single lobe 174 can include a large free turning range where there is no activation of the locking mechanism 130. In other words, the cam 174 can be positioned such that it would require nearly 360 degrees of rotation before the lobe 172 will engage the locking mechanism 130. Such would be the case if the lobe 172 were positioned on the outside of pin 148, but needed to push on the inside of pin 150 to engage the locking mechanism 130. In alternative implementations, the opposing actuator can include, or be associated with, a second tri-lobe cam 100 and include the associated benefits.

Figure 6A:
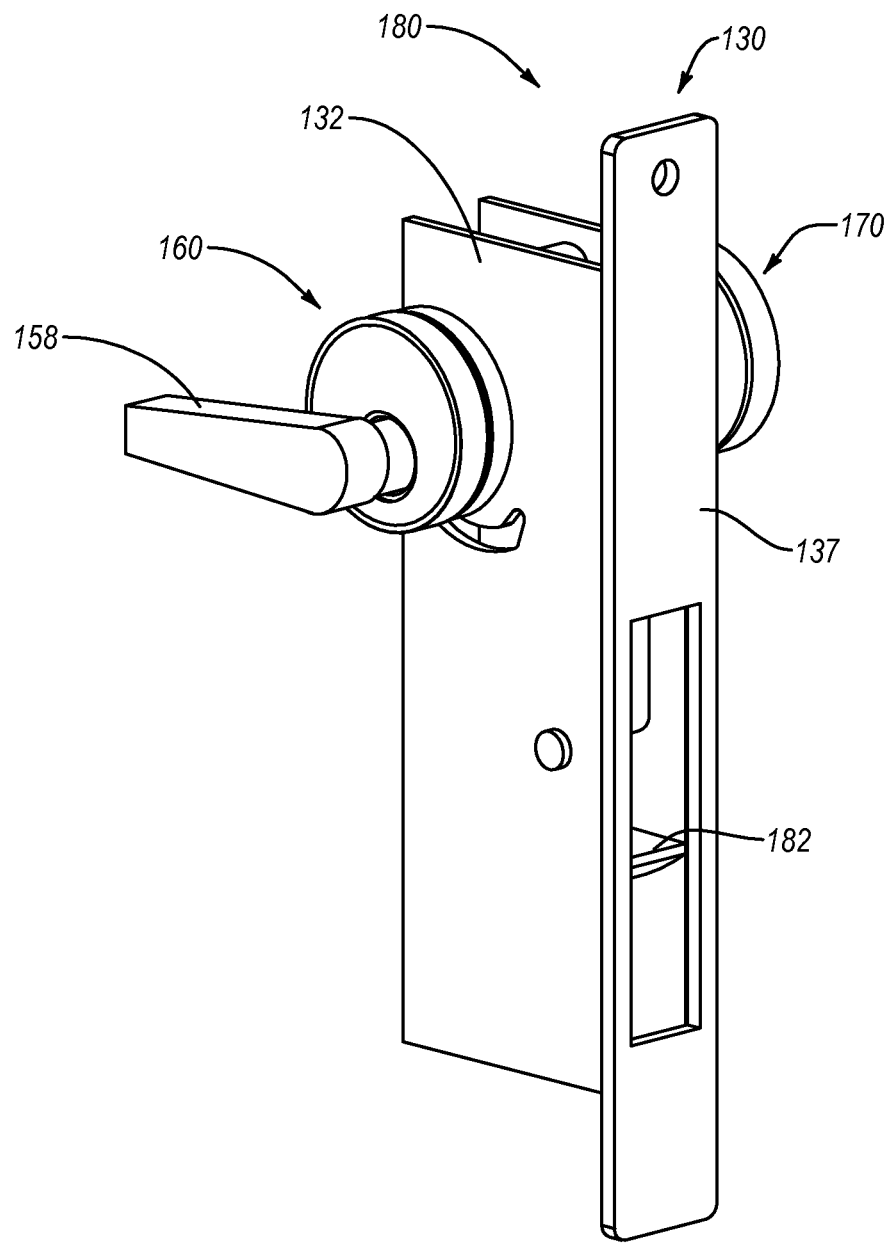
FIG. 6A illustrate a perspective view of a side engaging lock assembly in an unlocked configuration according to one or more implementations of the present invention.
Figure 6B:
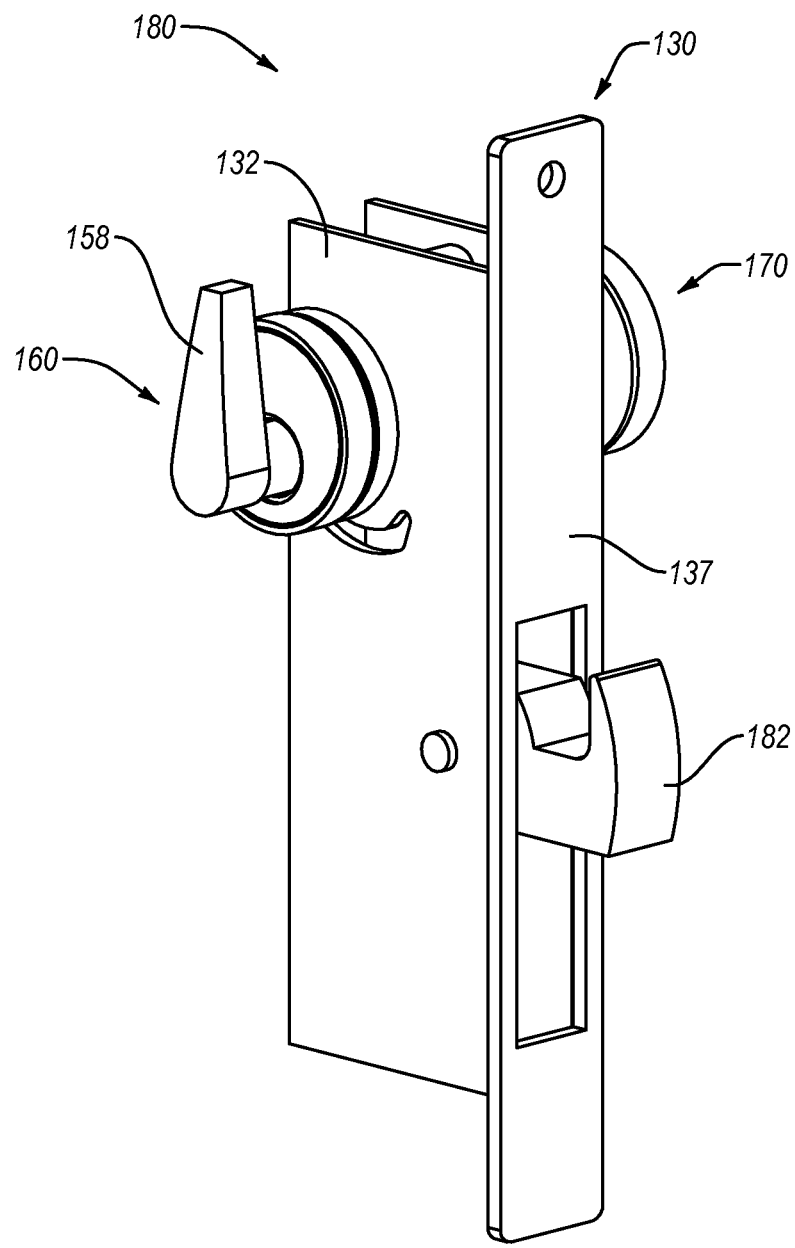
FIG. 6B illustrates a perspective view of the side engaging lock assembly of FIG. 6A in locked configuration.

Implementations of the present invention further include locks or locking assemblies including one or more tri-lobe cams 100. For example, FIGS. 6A and 6B illustrate a lock or locking assembly 180. In particular, FIG. 6A illustrates the lock or locking assembly 180 in an unlocked configuration, while FIG. 6B illustrates the lock or locking assembly 180 in a locked configuration.

The locking assembly 180 can include a locking mechanism 130, a first actuator (i.e., thumb turn lever 158) and a second actuator (i.e., keyed mortise cylinder 170). The first and second actuators 158, 170 attach to opposing sides of the locking mechanism 130. The first actuator or thumb turn lever 158 is associated with a tri-lobe cam 100 (FIGS. 1A-1B), while the second or opposing actuator 170 is associated with a single-lobed cam 172 (FIG. 5B).

When in the unlocked configuration as shown in FIG. 6A, the tri-lobe cam 100 is in the position shown in FIG. 3A. Furthermore, FIG. 6A illustrates that the body 132 of the locking mechanism 130 houses a latch 182. Upon rotation of the thumb turn lever 158 90 degrees clockwise, the tri-lobe cam 100 moves from the unlocked position shown in FIG. 3A to the locked position in FIG. 3D. By so doing the pivot plate 142 moves from a higher and forward position (FIG. 3A) to a lower and rearward position (FIG. 3D). Such motion can cause a lever 182 to rotate out of the body 132 of the locking mechanism 130 as shown by FIG. 6B. One will appreciate that the lever 182 can engage a wall, frame, adjacent door, or other structure.

One will appreciate in light of the disclosure herein that when an operator uses the opposing actuator 170 to move the lock or locking assembly from the locked position (FIG. 6B) to the unlocked configuration (FIG. 6A), the tri-lobe cam 100 can cause the thumb turn lever to automatically rotate from the locked position shown in FIG. 6B to the unlocked position FIG. 6A. With the thumb turn lever in the unlocked position (FIG. 6A), the thumb turn lever 158 is ready for an operator to rotate it a fourth of a turn clockwise to immediately engage the locking mechanism 130.

Figure 7A:
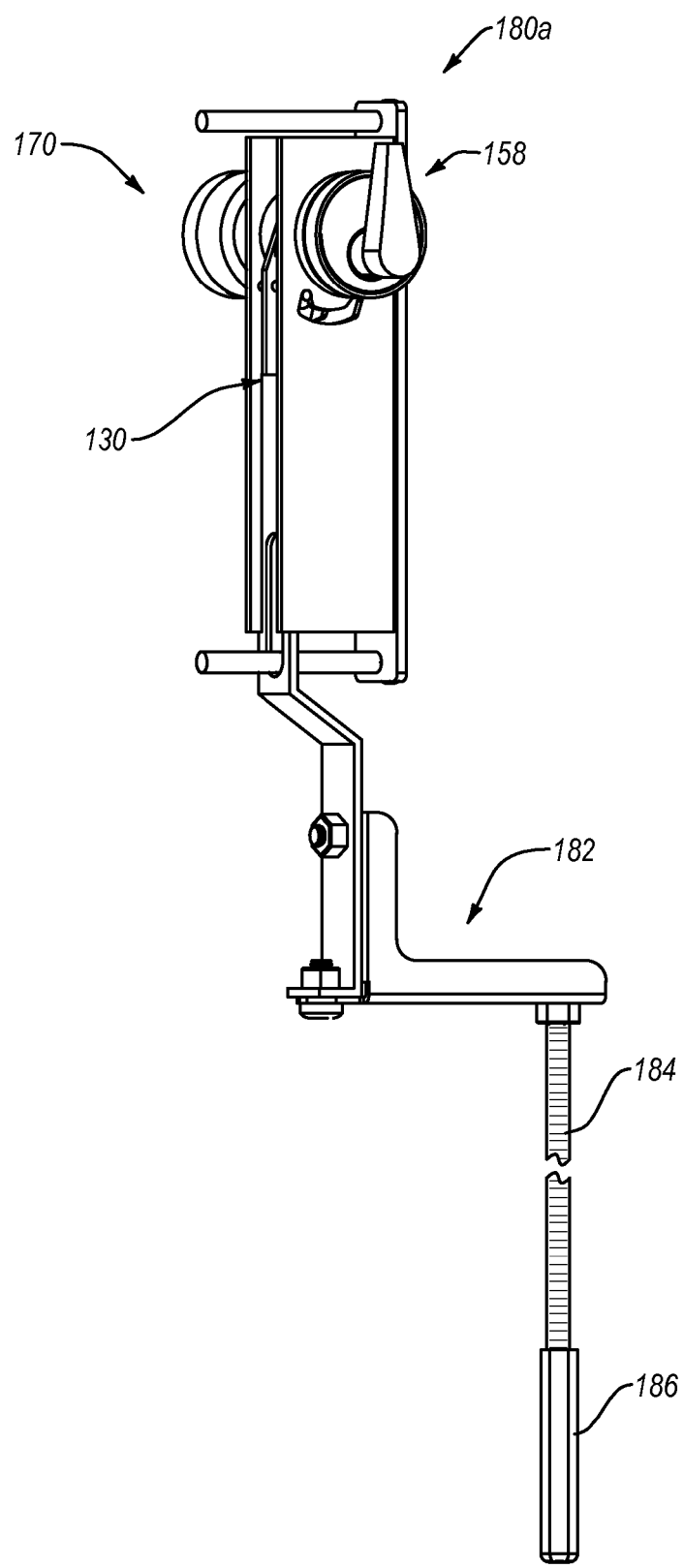
FIG. 7A illustrates a perspective view of a bottom engaging lock assembly in an unlocked configuration according to one or more implementations of the present invention.
Figure 7B:
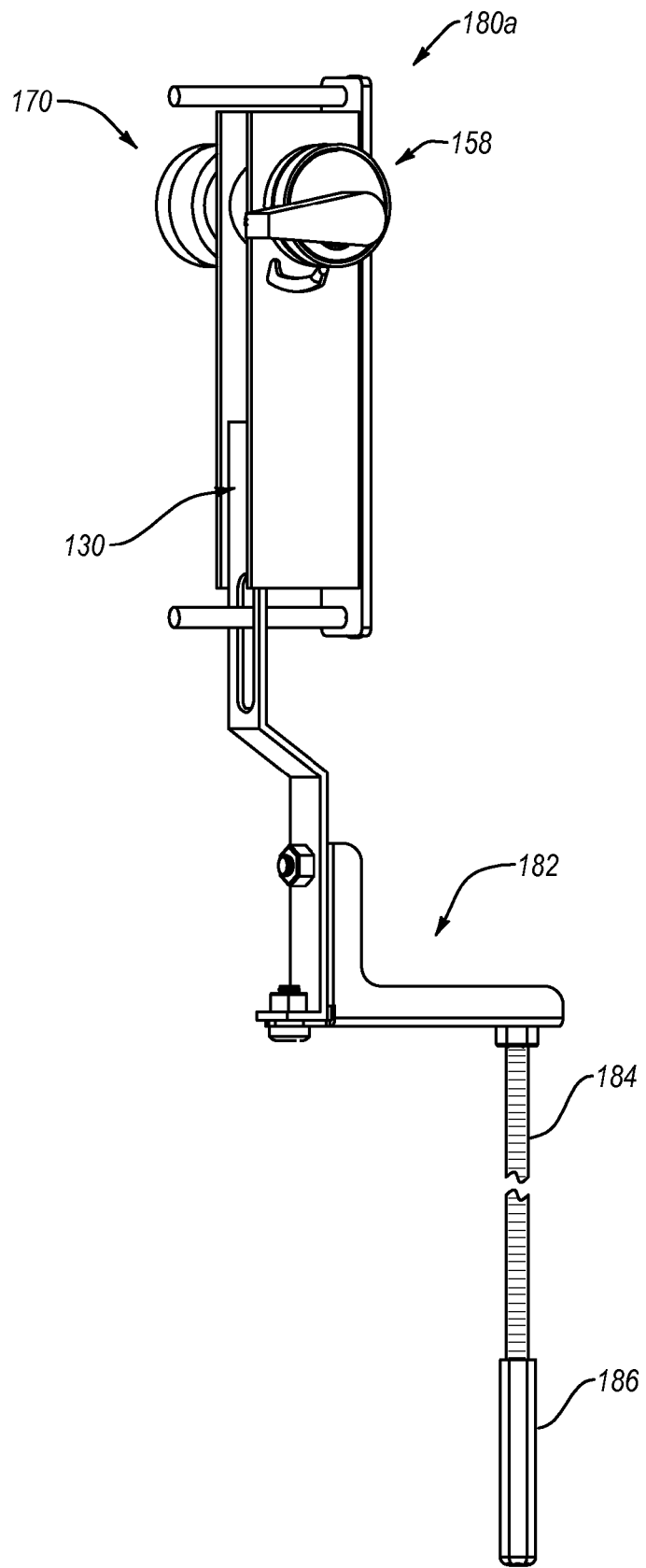
FIG. 7B illustrates a perspective view of the bottom engaging lock assembly of FIG. 7A in locked configuration.

While FIGS. 6A and 6B illustrate a side engaging locking assembly, the present invention is not so limited. For example, FIGS. 7A-7B illustrate another implementation of a locking assembly 180a. The locking assembly 180a is a bottom engaging locking assembly.

The locking assembly 180a can include a locking mechanism 130, a first actuator (i.e., thumb turn lever 158) and a second actuator (i.e., keyed mortise cylinder 170). The first and second actuators 158, 170 attach to opposing sides of the locking mechanism 130. The first actuator or thumb turn lever 158 is associated with a tri-lobe cam 100 (FIGS. 1A-1B), while the second or opposing actuator 170 is associated with a single-lobed cam 172 (FIG. 5B).

When in the unlocked configuration as shown in FIG. 7A, the tri-lobe cam 100 is in the position shown in FIG. 3A. Furthermore, FIG. 7A illustrates that locking mechanism 130 includes a latch 182 attached to a locking rod 184 and an engagement member 186. Upon rotation of the thumb turn lever 158 90 degrees counter-clockwise, the tri-lobe cam 100 moves from the unlocked position shown in FIG. 3A to the locked position in FIG. 3D. By so doing the pivot plate 142 moves from a higher and forward position (FIG. 3A) to a lower and rearward position (FIG. 3D). Such motion can cause the lever 182 to move the locking rod 184 and engagement member 186 downward so as to engage a hole in the floor, door frame, or track as shown by FIG. 7B.

One will appreciate in light of the disclosure herein that when an operator uses the opposing actuator 170 to move the lock or locking assembly from the locked position (FIG. 7B) to the unlocked configuration (FIG. 7A), the tri-lobe cam 100 can cause the thumb turn lever 158 to automatically rotate from the locked position shown in FIG. 7B to the unlocked position FIG. 7A, or vice versa. With the thumb turn lever 158 in the unlocked position (FIG. 7A), the thumb turn lever 158 is ready to immediately engage the locking mechanism 130.

Figure 8:
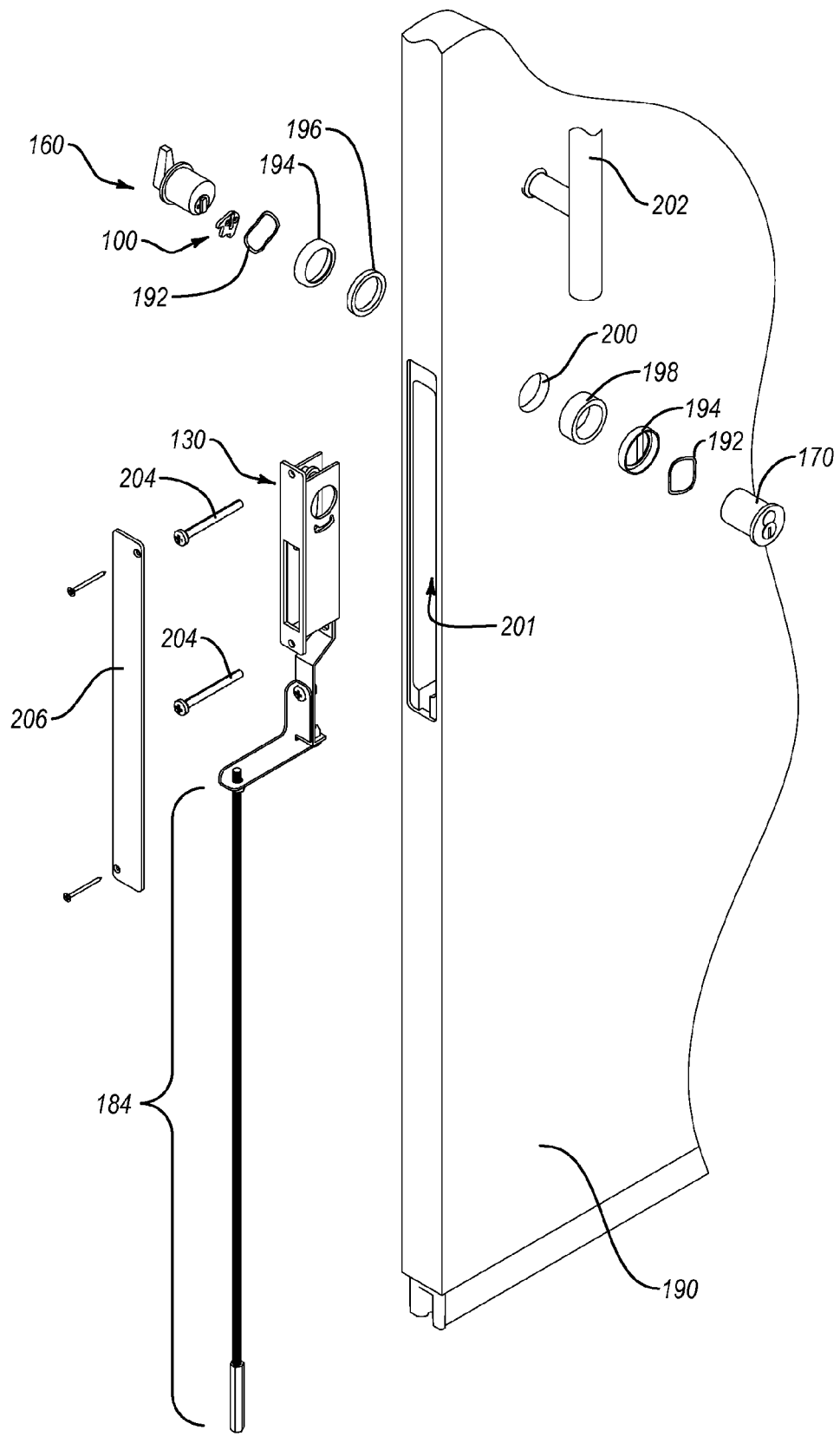
FIG. 8 illustrates a door assembly according to one or more implementations of the present invention.

FIG. 8 illustrates an exploded view of an exemplary door 190 that employs a tri-lobe cam 100 according to one or more implementations of the present invention. The door 190 further includes a thumb turn assembly 160 and a keyed cylinder 170 coupled to a locking mechanism 130 inside the door 190. FIG. 8 shows that locking mechanism 130 has a bottom locking configuration that deploys and retracts a locking rod 184. In alternative implementations; however, the door 190 may employ a tri-lobe cam 100 with other configurations of locking mechanisms 130 and latches. For example, the locking mechanism 130 can include a side engaging latch (such as that shown in FIGS. 6A-6B), a top engaging feature, or a deadbolt. In any event, FIG. 8 illustrates that the door 190 can include a pull handle 202.

Implementations of the present invention also provide methods of installing a thumb turn assembly 160, or other actuator, having a tri-lobe cam 100 within a standard MS style lock. Because of the two additional outer lobes 104a, 104b that restrict rotation of the tri-lobe cam 100, an installer may not be able to assembly the tri-lobe cam 100 in a typical manner. For example, if a thumb turn assembly 160 were installed with the tri-lobe cam 100 turned to fit within the lock body as shown in FIG. 4A and secured with a set screw (thus prohibiting the further rotation of the cylinder), when the thumb turn lever 158 is rotated, the outside edge of the outer lobes 104a, 104b would strike against the outside edge of pins 148, 150, preventing the locking mechanism 130 from functioning. An installer can assemble conventional cams in this manner because the single lobe may rotate freely throughout a 360 degree range of rotation.

In order for a tri-lobe cam 100 to function within an MS style lock, the center lobe 106 may need to fit inside the outer pins 148, 150 so that the center lobe 106 can push the center pin 146 down to release the locking mechanism 130, while the outer lobes 148, 150 act against pins 148, 150 to control the rotation of the thumb turn lever 158. To install the thumb turn assembly 160, an installer can turn the thumb turn lever 158 to position the tri-lobe cam 100 within the outer diameter of the cylinder thumb turn assembly 160 as shown in FIG. 4A. Next the installer can assemble a spring washer 192, a security ring 194, and a spacer 196 on the cylinder of the thumb turn assembly 160. With the tri-lobe cam 100 in this position and with the locking mechanism 130 in the open position, the installer then can thread the thumb turn assembly 160 into the opening 200 in the door 190 and into the latch body 132. One will appreciate that the latch body 132 can be secured within the opening 201 of the door 190 via one or more fasteners 204.

Once the thumb turn assembly 160 is threaded into the door opening 200 a sufficient distance, the installer can rotate the thumb turn assembly 160 until the thumb turn lever axis is at the top of the thumb turn assembly 160. Then, the installer can turn the thumb turn lever 158 so it points upwards.

While maintaining the thumb turn lever 158 in the upward position, the installer then tightens the thumb turn assembly 160 until the lever axis is at the bottom of the thumb turn assembly 160. By loosening the thumb turn assembly 160 while maintaining the thumb turn lever 158 in the upward position, the installer can insert the center lobe 106 between outer pins 148, 150.

Finally, the installer can tighten a set screw to maintain the position of the thumb turn assembly 160 within the lock body 132. With the thumb turn lever 158 pointing upward, the lock is in the open position. The installer can then turn the cam 172 of the keyed mortise cylinder 170 to fit within the diameter of the keyed mortise cylinder 170. Next the installer can assemble a spring washer 192, a security ring 194, and a spacer 198 on the keyed mortise cylinder 170. With the cam 172 in this position and with the locking mechanism 130 in the open position, the installer then can thread the keyed mortise cylinder 170 into the opening 200 in the door 190 and into the latch body 132. Additionally, the installer can secure a face plate 206 to the panel 190 over the opening 201. Thus, the face plate 206 can conceal the locking mechanism 130 from view.

To lock the door, the operator can turn the thumb turn lever 158 a quarter turn in a counter-clockwise direction. Of course, by inverting the tri-lobe cam 100 on the thumb turn assembly 160, the position of the lever axis and/or the direction the lever points in the open and locked positions will be different. Accordingly, the position of the axis and thumb turn lever 158 during installation recited above are exemplary. The recited method should therefore not be limited to the specific recited directions or positions of the thumb turn assembly. Other lever orientations and axis positions can also result in proper assembly with the center lobe 106 fitting between pins 148, 150.

Although the invention has been primarily described with respect to MS style locks, the described cam could also function within other types of locks. For example, the cam could be used within locks that employ locking mechanisms with pins or other similar structure by modifying the shape, angle, or size of any of the lobes to match the structure of the locking mechanism.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A lock assembly for a partition, comprising:
    a locking mechanism including a pivot plate having a center pin positioned between first and second outer pins;
    a lock body;
    a pivot rod pivotally coupling the pivot plate to the lock body; and
    a tri-lobe cam including a center lobe positioned between a first outer lobe and a second outer lobe, the center lobe having first and second curved surfaces on either side thereof, the curvature of the first curved surface being different than the curvature of the second surface;
    wherein the tri-lobe cam is configured to engage the center pin and the first and second outer pins to move the locking mechanism between an unlocked position and a locked position;
    wherein the center pin is positioned between the center lobe and the first outer lobe in the unlocked position and between the center lobe and the second outer lobe in the locked position;
    wherein the first outer pin abuts the first outer lobe in the unlocked position and the second outer pin abuts the second outer lobe in the locked position; and
    wherein the first and second outer lobes have inner surfaces facing the center lobe, the first and second outer pins being constrained by the outer lobes to remain between the inner surfaces.

2. The lock assembly as recited in claim 1, wherein the center lobe of the tri-lobe cam is sized and configured to depress the center pin of the locking mechanism to release the locking mechanism from the locked and unlocked positions.

3. The lock assembly as recited in claim 1, wherein the center lobe of the tri-lobe cam is asymmetrical.

4. The lock as recited in claim 1, wherein the locking mechanism is a bottom, a top, or a side engaging locking mechanism.

5. The lock assembly as recited in claim 1, wherein the first outer lobe and the center lobe sequentially engage the first outer pin as the locking mechanism moves between the unlocked position and the locked position.

6. The lock assembly as recited in claim 1, wherein when in the locked position:
    the center pin prevents the pivot plate from rotating; and
    the second outer pin prevents the tri-lobe cam from rotating in a first direction.

7. The lock assembly as recited in claim 6, wherein when in the unlocked position:
    the center pin prevents the pivot plate from rotating; and
    the first outer pin prevents the tri-lobe cam from rotating in a second direction, the second direction being opposite of the first direction.

8. A partition for selectively dividing a space, the partition comprising:
- a panel including a first side and a second opposing side;
- a locking mechanism mounted in the panel, the locking mechanism including a first side and a second opposing side;
- a first actuator positioned on the first side of the panel and coupled to the first side of the locking mechanism;
- a second actuator positioned on the second side of the panel and coupled to the second side of the locking mechanism;
- a pivot plate positioned between the first side and the second opposing side, wherein the pivot plate comprises a first outer pin and a second outer pin;
- an asymmetrical tri-lobe cam rotationally coupled to the first actuator and the second actuator, the asymmetrical tri-lobe cam including a center lobe positioned between a first outer lobe and a second outer lobe, the center lobe having first and second curved surfaces, the curvature of the first curved surface being different than the curvature of the second surface, wherein:
- the first outer lobe and the second outer lobe are sized and configured to limit rotation of the tri-lobe cam and the first actuator to a range of approximately 90 degrees,
- the first outer pin is positioned between the first outer lobe of the tri-lobe cam and the center lobe of the tri-lobe cam,
- the second outer pin is positioned between the second outer lobe of the tri-lobe cam and the center lobe of the tri-lobe cam,
- the center lobe of the tri-lobe cam is sized and configured to depress the center pin of the locking mechanism to release the locking mechanism from the locked and unlocked positions;
- the center pin is positioned between the center lobe and the first outer lobe in the unlocked position and between the center lobe and the second outer lobe in the locked position;
- the first outer pin abuts the first outer lobe in the unlocked position and the second outer pin abuts the second outer lobe in the locked position; and
- the first and second outer lobes have inner surfaces facing the center lobe, the first and second outer pins being constrained by the outer lobes to remain between the inner surfaces.

9. The partition as recited in claim 8, wherein one or more of the center lobe, first outer lobe, and the second outer lobe are configured to cause the tri-lobe cam and the first actuator to move between a locked position and an unlocked position as the second actuator moves the locking mechanism between a locked position and an unlocked position.

10. The partition as recited in claim 9, wherein the tri-lobe cam and the first actuator are maintained in position to immediately rotate the locking mechanism when the locking mechanism is in the locked position and the unlocked position.

11. The partition as recited in claim 8, wherein one or more of the center lobe, first outer lobe, and the second outer lobe maintain the tri-lobe cam in alignment with the locking mechanism.

12. The partition as recited in claim 11, wherein one or more of the center lobe, first outer lobe, and the second outer lobe maintain the center pin, the first outer pin, and the second outer pin between the inner surface of the first outer lobe and the inner surface of the second outer lobe.

13. The partition as recited in claim 8, wherein:
the first actuator comprises a thumb turn lever; and
the second actuator comprises a keyed mortise cylinder.

14. The partition as recited in claim 8, wherein the partition comprises one of a pivoting door and a sliding door.

* * * * *